(12) United States Patent
Vannithamby et al.

(10) Patent No.: US 9,042,286 B2
(45) Date of Patent: May 26, 2015

(54) REDUCING WIRELESS POWER CONSUMPTION AND SIGNALING OVERHEAD FOR INTERNET APPLICATION BACKGROUND MESSAGES

(71) Applicant: Intel Corporation, Santa Clara, CA (US)

(72) Inventors: Rath Vannithamby, Portland, OR (US); Ali Koc, Hillsboro, OR (US); Maruti Gupta, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 176 days.

(21) Appl. No.: 13/626,342

(22) Filed: Sep. 25, 2012

(65) Prior Publication Data

US 2013/0114485 A1    May 9, 2013

Related U.S. Application Data

(60) Provisional application No. 61/556,109, filed on Nov. 4, 2011.

(51) Int. Cl.
*H04W 52/00* (2009.01)
*H04W 52/28* (2009.01)
*H04W 24/02* (2009.01)
*H04W 88/00* (2009.01)
*H04W 28/06* (2009.01)
H04W 52/02 (2009.01)

(52) U.S. Cl.
CPC .......... *H04W 28/06* (2013.01); *H04W 52/0209* (2013.01); *H04W 52/0264* (2013.01); *Y02B 60/50* (2013.01)

(58) Field of Classification Search
CPC .. Y02B 60/50; H04W 52/00; H04W 52/0209; H04W 76/048
USPC ......................................................... 370/311
See application file for complete search history.

(56) References Cited

U.S. PATENT DOCUMENTS

2007/0237121 A1    10/2007   Khandelwal et al.
2007/0258419 A1*   11/2007   Zhao et al. .................... 370/338

(Continued)

OTHER PUBLICATIONS

International Search Report and Written Opinion received for PCT Patent Application No. PCT/US2012/063472 mailed on Feb. 27, 2013, 10 pages.

*Primary Examiner* — Ahmed Elallam
(74) *Attorney, Agent, or Firm* — Thorpe, North & Western, LLP.

(57) ABSTRACT

Technology is discussed for reducing the frequency of signaling overhead and power consumption on wireless mobile devices employed to support internet applications in a Wireless Wide Area Network (WWAN). Demands for battery power and signaling overhead frequently arise to support background messages of little significance and/or urgency when internet applications are unattended on wireless mobile device attempting to conserve power. An identification module can be triggered to identify such background messages, based on a variety of factors. The identification module can also determine whether to buffer and/or drop such messages with information local to the wireless mobile devices and/or in such background messages. Such buffering and dropping measures can reduce the frequency with which wireless mobile devices consume large amounts of power and/or require signaling overhead to send and receive these background messages.

25 Claims, 9 Drawing Sheets

(56) References Cited

U.S. PATENT DOCUMENTS

| | | |
|---|---|---|
| 2009/0161540 A1* | 6/2009 | Zaki et al. .................... 370/230 |
| 2010/0246591 A1* | 9/2010 | Gobriel et al. ................ 370/412 |
| 2011/0183726 A1 | 7/2011 | Deng |
| 2011/0205946 A1 | 8/2011 | Avital et al. |
| 2011/0252423 A1* | 10/2011 | Freedman et al. ........... 718/100 |
| 2011/0286340 A1* | 11/2011 | Janecek et al. ................ 370/252 |
| 2012/0207070 A1* | 8/2012 | Xu et al. ....................... 370/311 |
| 2013/0052965 A1* | 2/2013 | Meylan et al. ................. 455/73 |
| 2013/0053013 A1* | 2/2013 | Giaretta et al. ............... 455/418 |
| 2013/0083713 A1* | 4/2013 | Johansson et al. ........... 370/311 |
| 2013/0084869 A1* | 4/2013 | Johansson et al. ........... 455/436 |
| 2013/0286913 A1* | 10/2013 | Chanterac .................... 370/311 |

\* cited by examiner

REDUCING WIRELESS POWER CONSUMPTION AND SIGNALING OVERHEAD FOR INTERNET APPLICATION BACKGROUND MESSAGES

RELATED APPLICATIONS

This application claims the benefit of and hereby incorporates by reference U.S. Provisional Patent Application Ser. No. 61/556,109, filed Nov. 4, 2011.

BACKGROUND

The increased use of wireless mobile devices supporting internet applications in Wireless Wide Area Networks (WWAN) has created issues, from increased demand for bandwidth to the accommodation of features of these internet applications. As examples of these features, several internet applications can communicate frequently over the WWAN. These frequent communications can create excessive demands on the WWAN.

Additionally, the frequent communications between the WWAN and certain internet applications can be power intensive resulting in undesirable drain on battery power. The relatively slow improvement in battery technology places a larger emphasis on minimizing unnecessary communications to maximize the length a wireless mobile device can remain operational using it's battery.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
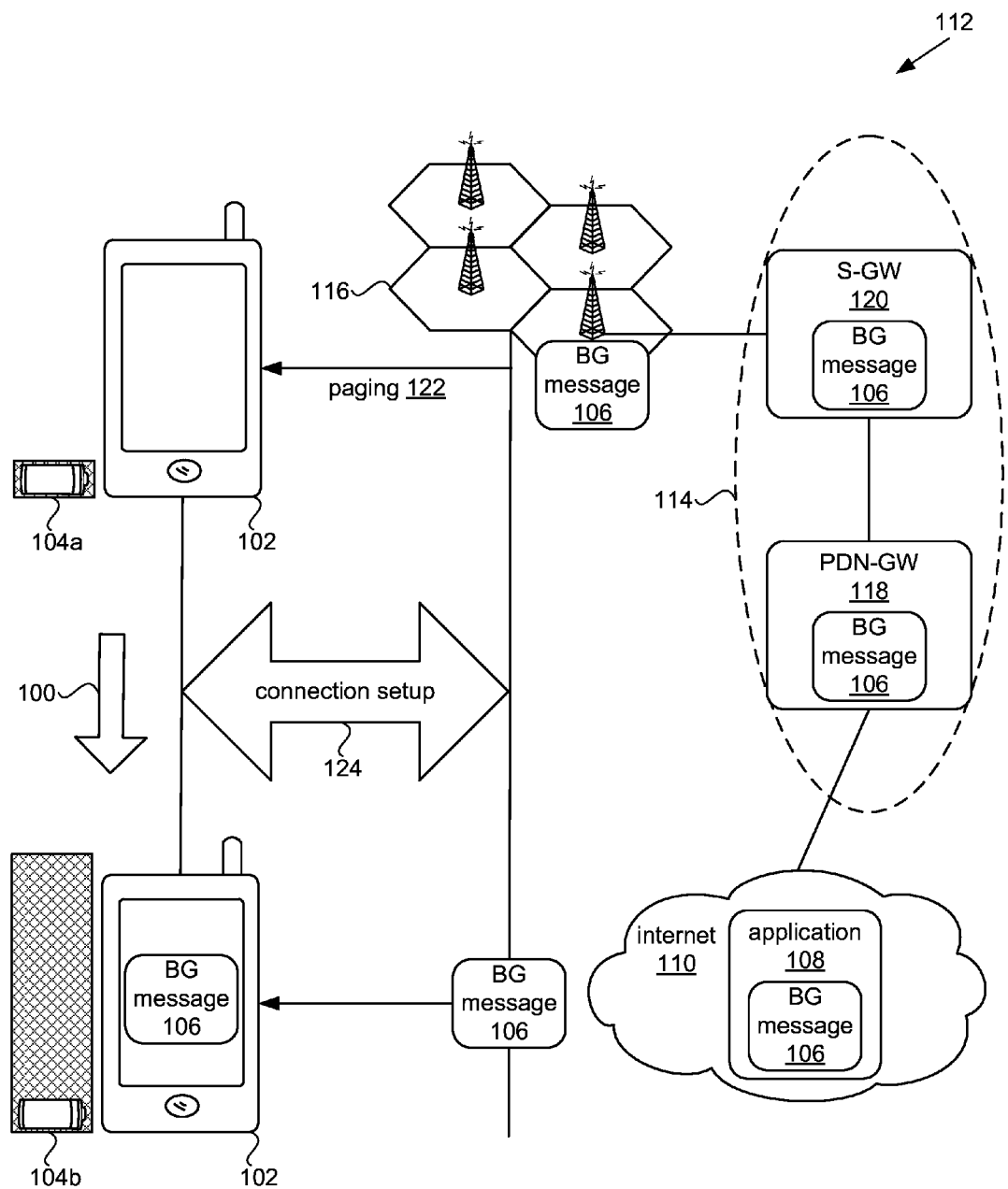
FIG. 1 is a block diagram illustrating a transition at a wireless mobile device from a relatively low power, power saving mode to a relatively high power mode to receive a background message associated with an internet application.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

Different terminology for wireless mobile devices is used in different specifications. As used herein, a wireless mobile device can be a User Equipment (UE) or a Mobile Station (MS), among other possibilities. Throughout this application, the terms wireless mobile device, UE, and MS can be used interchangeably.

As used herein the term "transmission point" is defined as a wireless communication device in a Wireless Wide Area Network (WWAN) configured to communicate with a plurality of wireless mobile devices located within a geographic region referred to as a cell. Different terminologies for transmission points are used in different specifications. Terminology used for different variations of a transmission point can include, but are not limited to, a Base Station (BS), an evolved Node B (eNodeB or eNB), a WWAN transmission point, a transmission point, a wireless transmission point, and a WWAN node. The terms are used interchangeably, unless otherwise noted. The actual definition of a BS or eNodeB is provided in their Institute of Electronics and Electrical Engineers (IEEE) 802.16 and Third Generation Partnership Project (3GPP) specifications.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology, nor is it intended to limit the scope of the claimed subject matter.

Many types of applications no longer operate on standalone devices. Rather, the applications can operate, at least in part, on a server that is in communication with a computing device. Internet applications configured to operate on mobile wireless devices can continue to communicate with a server via a wireless network after a user ceases to interact with such applications, i.e., when these internet applications are minimized or placed in the background. These communications can result in frequent messaging. The sending of short, frequent messages by internet applications, which are referred to herein as background messages, can place strains on mobile battery power and on Wireless Wide Area Networks (WWAN).

As used herein, the term "background message" refers to a message generated by an internet application with a low significance and/or low urgency. In addition, a background message can refer to a type of packet produced by an application when it is running in the "background", i.e. when the application is no longer actively interacting with the user, but still consuming Central Processing Unit (CPC) resources in order to perform tasks such as keeping a connection open, providing periodic update information, sending presence updates etc. Examples of internet applications that require support for these background messages include SKYPE, YAHOO MESSENGER, GTALK, FACEBOOK, TWITTER, and many more. Applications related to what has been termed "social media" are particularly prone to such short, frequent messages.

Unfortunately, these background messages, sent from and received by wireless mobile devices in a WWAN can cause a wireless mobile device to transition out of a power saving mode to send or receive the background messages. To come out of a power saving mode, a wireless mobile device consumes power. In some instances, the wireless mobile device also consumes power as it goes through the process of reestablishing connections with a WWAN. The wireless mobile device also consumes power by sending and/or receiving background messages and by spending time out of a power saving mode (i.e. setup to actively transmit and receive information via the WWAN).

The consumption of power caused by background messages at battery operated wireless mobile devices, where power is at a premium, is a significant problem. Additionally, background messages can increase signaling traffic both over the air interface and within the core network of the WWAN. These increases in signaling traffic can be due to the large amount of signaling required to reestablish connections between a wireless mobile device and the WWAN in the process of transitioning the wireless mobile device out of a power saving mode.

However, power intensive transitions to higher power states and signal overhead associated with frequent reconnections of wireless mobile devices with a WWAN can be avoided. Background messages are often of relatively minor significance and typically do not have strict latency requirements. Background messages with low significance and/or low urgency can be identified at a transmission point and/or at a wireless mobile device before they are sent across a WWAN. Once they are identified, many of such background messages can be buffered or dropped. Messages that are buffered can be buffered for a period of time to allow a wireless mobile device to stay in a low power mode longer and/or reduce re-connection overhead in a WWAN.

FIG. 1 depicts a transition 100 at a wireless mobile device 102 from a relatively low power, power saving mode 104a to a relatively high power connection mode 104b to receive a background message 106 associated with an internet application 108. The internet application is accessible over the internet 110 in communication with a WWAN 112. By way of example and not limitation, the particular WWAN depicted can be consistent with the standards for Third Generation Partnership Project (3GPP) Long Term Evolution (LTE). However, several different types of WWAN architectures consistent with alternative standards for wireless communication are possible. As an important statement of the generality of embodiments discussed in this disclosure, while the terminology of examples consistent with 3GPP LTE standards are often used throughout this specification, they is not intended to be limiting, and there are exceptions in the use of more general terminology in portions of this specification to further communicate this point.

In the example embodiment illustrated in FIG. 1, the WWAN 112 can comprise a Core Network (CN) 114 and a Radio Access Network (RAN) 116. The CN can comprise an Evolved Packet Core, and the RAN can comprise an Evolved-Universal Terrestrial Network (E-UTRAN). The EPC can communicate with the internet 110 through a Packet Data Network Gate Way (PDN-GW) 118. The E-UTRAN can communicate with the EPC over the Serving Gate Way (S-GW) 120, which can be in communication with the PDN-GW to complete the link between the E-UTRAN and the internet application 108.

Although the wireless mobile device 102, which can be a User Equipment (UE), can communicate with the internet application 108 operating on a server by means of the WWAN 112, the UE needs to be in a connection mode 104b, such as Radio Resource Control (RRC)_CONNECTED, for communication to take place. However, A UE can expend 500 to 1500 milliwatts to maintain itself in RRC_CONNECTED mode. Conversely, the same UE can save a large portion of this power in a power saving mode 104a, such as Discontinuous Reception (DRX) mode, or RRC_IDLE mode. For example, the UE can expend only 5 to 10 milliwatts in RRC_IDLE mode, potentially one-hundredth (two orders of magnitude), or less, of the power used to maintain the RRC-_CONNECTED mode.

The UE 102 depicted in FIG. 1 is first depicted in a power saving mode 104a, as indicated by the adjacent, low power-consumption bar depicted with the battery icon and the diamond cross-hatching. However, the internet application 108 can generate a background message 106 intended for the UE. The background message is depicted at various points in time as it can be communicated from the internet application 108 to the UE 102. For example, the background message is depicted as it is generated in the internet application. Again, the background message is depicted as it is communicated to the PDN-GW 118 within the EPC 114. Next, the background message is depicted as communicated to the S-GW 120, and, then, the background message is depicted as it is communicated to the E-UTRAN 116.

Since the UE 102 is initially in a power saving mode 104a, the UE, for which the background message 106 is intended, cannot receive the background message. The E-UTRAN 116 can page 122 the UE to indicate the presence of a communication for the UE. To receive the communication, the UE can transition from a power saving mode 104a to a communication mode 104b, as depicted by the high power-consumption bar, depicted with the battery icon and the diamond cross-hatching adjacent to the UE in connected mode. A large increase in power between the UE in power save mode and connected mode can be noted.

This difference in power consumption, which can span orders of magnitude, can potentially be disproportionate to the levels of power consumption depicted. The difference in power consumption can vary depending on the power saving mode 104a from which the UE transitions and/or the communication mode 104b to which the UE transitions. Examples of a power saving mode, by way of illustration and without limitation, can include DRX mode during an opportunity period, referred to herein as DRX mode unless otherwise indicated, and RRC_IDLE mode.

DRX mode provides an example of one type of power saving mode 104a for which a connection can be maintained between the UE 102 and the E-UTRAN 116. A power saving mode that can maintain a connection between UE and E-UTRAN is referred to herein as a "mid low power mode." DRX can be applied when the UE is in RRC_IDLE or RRC_CO-NNECTED mode. When DRX is applied during RRC_CO-NNECTED mode, a connection can be maintained with the E-UTRAN. However, the UE can power down for some pre-negotiated intervals of time known as "opportunity periods," as opposed to "on-duration periods" when the UE can receive transmissions. Therefore, the UE may not be in a receiving mode for each and every frame, and can shut down for some frames in a periodic fashion.

While applying DRX in RRC_CONNECTED mode, the UE can transition to an "on-duration period" to receive the background message 106. The connection between the UE and the E-UTRAN does not need to be re-established when switching from an "opportunity period" to an "on-duration period." Hence, signaling overhead is less of a concern when applying DRX in RRC_CONNECTED mode. Power consumption, however, can remain a big problem. The magnitude of the problem can be particularly significant because of the frequency with which background messages can be sent and received, and the frequency with which the UE is powered up to transition to an "on-duration period."

RRC_IDLE provides an example of one type of power saving mode 104a for which a connection is not maintained between the UE 102 and the E-UTRAN 116. A power saving mode that does not maintain a connection between UE and E-UTRAN is referred to herein as a "deep low power mode." Not only must the UE power up to receive the background message 106, but the UE can also engage in signaling to reconnect 124 with the E-UTRAN. Reconnection with the network can involve a large amount of signaling overhead. Not only can signaling be involved to establish the connection as such, but additional signaling can be involved over the air interface and at the CN 114. The additional signaling can be, for example, to show that the UE is a bona-fide subscriber, access authentication servers, establish IP tunneling, etc.

Messages involved in re-establishing 124 the connection can number between twenty to thirty messages, many of them involving bidirectional communication. In addition to potentially frequent drains on battery power to receive the background message 106, therefore, significant signaling overhead can also be imposed across the backbone of the WWAN 112 and at the servers in the CN 114. Furthermore, the UE 102 can remain in a relatively high power mode 104b for extended periods as it engages in the signaling involved in re-establishing the connection with the WWAN. Similar problems can arise when background messages are generated at the UE. Thus, frequent disconnection and reconnection by a wireless mobile device to enable frequent communication with internet applications can result in significant battery drain as well as relatively high overhead in the CN.

Figure 2:
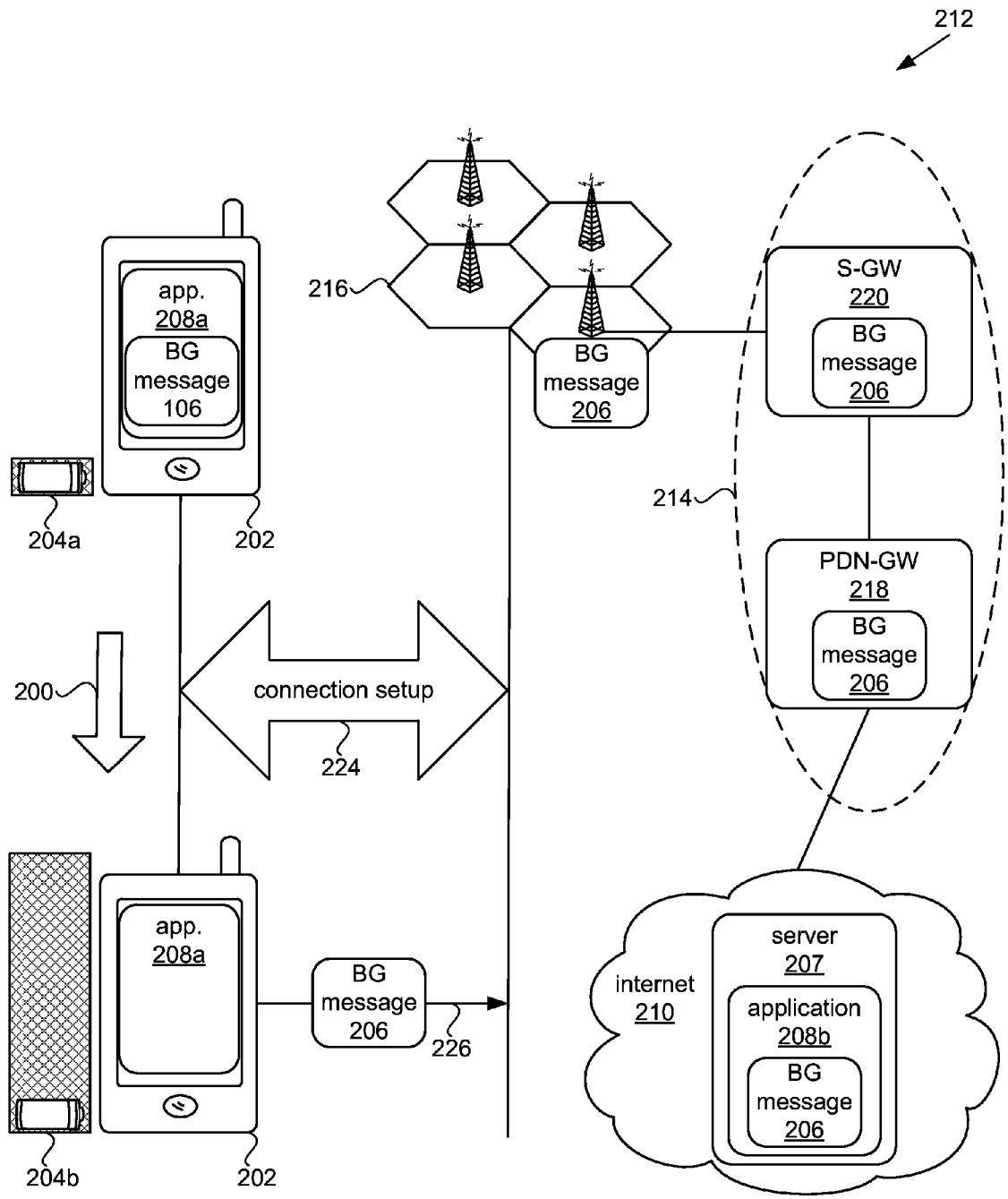
FIG. 2 is a block diagram illustrating a transition at a wireless mobile device from a relatively low power, power saving mode to a relatively high power mode to send a background message associated with an internet application.

FIG. 2 depicts a transition 200 at a wireless mobile device 202 from a relatively low power, power saving mode 204a to a relatively high power mode 204b to send a background message 206 associated with an internet application 208. A first instance of an internet application 208a can reside at a wireless mobile device, which can be a UE. The first instance of the internet application can generate a background message 206 intended for a second instance of the internet application 208b that can reside on a server 207 connected to the internet 210, or directly to the CN 214. The second instance of the internet application 208b can comprise a plurality of instances of the internet application.

However, the UE 202 may not be able to send 226 the background message 206 to the second instance of the internet application 208b over a WWAN 212, because the UE can be in a power saving mode 204a, as indicated by the adjacent, low power-consumption bar depicted with the battery icon and the diamond cross-hatching. By way of illustration and not limitation, examples of the power saving mode can include DRX mode and RRC_IDLE mode. Other examples of a power saving mode consistent with 3GPP LTE and other standards are also possible. Therefore, the UE can transition 200 from the power saving mode to a communication mode 204b.

A non-limiting example, provided by way of illustration, of a communication mode 204b can include RRC_CON-NECTED mode. The nature of the transition 200 from the power saving mode 204a to the communication mode can differ depending on the nature of the power saving mode. For example, certain examples of the power saving mode, such as DRX mode, can maintain a connection with the WWAN 212 while powering down to conserve power. In other examples, such as RRC_IDLE, the connection is not maintained.

In examples for which a connection is maintained between the UE 202 and the WWAN 212, the UE still needs to power up to a communication mode 204b to send 226 the background message 206. As before, the difference in power consumption, which can span orders of magnitude, can potentially be disproportionate to the levels of power consumption depicted. In examples where the connection is not maintained, however, not only must the UE power up to receive the background message, but the UE can also engage in signaling to reconnect 224 with the WWAN. As discussed previously, reconnection with the network can involve a large amount of signaling overhead. Again, the frequency with which background messages can be sent from and to the UE can result in a high cost in power and signaling overhead.

Once the UE 202 has transitioned to communication mode 204b, the background message 206 can be sent 226 to a second instance of the internet application 208b over the WWAN 212. The background message is depicted at various points in time as it can be communicated from the first instance of the internet application 208a to the second instance of the internet application. The background message is first depicted at the UE, where it is generated. Next the background message is depicted as it is sent to the RAN 216, which can be an E-UTRAN, within the WWAN 212.

The background message 206 is also depicted at the E-UT-RAN 216 and, then, at an S-GW 220, which can serve to connect the E-UTRAN to the CN 214, which can be an EPC. Next, the background message is depicted as delivered to the PDN-GW 218, which can connect the EPN to the internet 210. Finally, the background message is depicted as delivered to the second instance of the internet application 208b.

As can be appreciated from FIG. 1 and FIG. 2, the cost of power consumption due to background messages 206 can be great, as can the cost of signaling overhead due to background messages. These costs become increasingly more and more important as more wireless mobile devices come to support internet applications that send such background messages on a frequent basis. The rise of social-media internet applications, which are particularly prone to sending such background messages, further compounds the problem.

However, many such background messages 206 are of comparatively small significance. For example, the internet application SKYPE can send status updates to indicate whether the application is attended or unattended by a user. Receiving such a status update, for example, which is typically received periodically, is of little significance for a UE 202 that is unattended and in a power saving mode 204a. Additionally, whether such background messages are received immediately, or at some time later, is of little significance.

Figure 3:
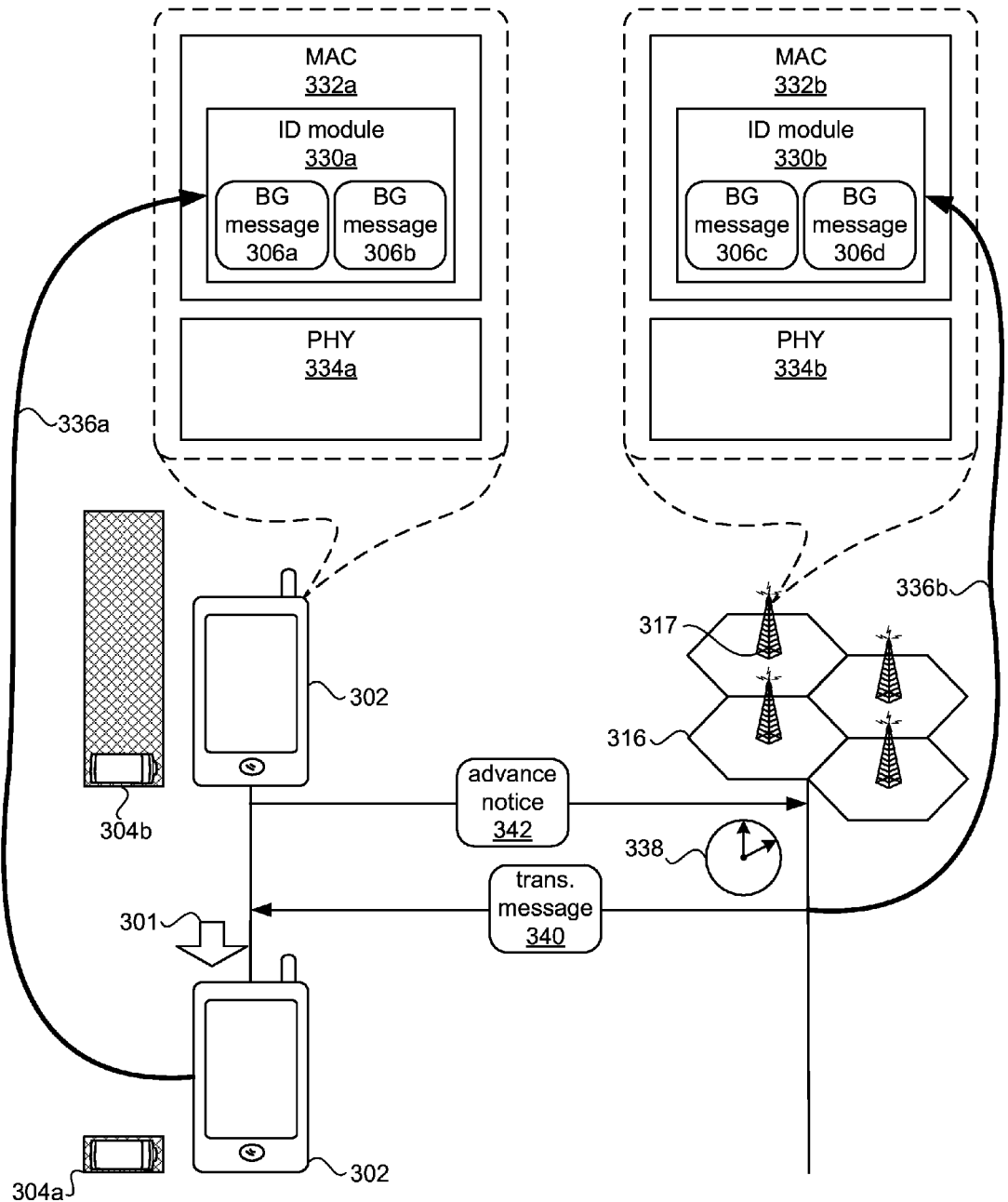
FIG. 3 is a block diagram illustrating an identification module that can reside at a wireless mobile device, a transmission point, or both, within a Media Access Control layer, to buffer and/or drop background messages upon a transition of the wireless mobile device to a power saving mode, in accordance with an example.

FIG. 3 depicts an identification (ID) module 330a, 330b that can reside at a wireless mobile device 302, a transmission point 317 within a RAN 316, or both. The ID module can further reside within a Media Access Control (MAC) layer 332a of a wireless mobile device, which can be a UE, and/or a MAC layer 332b of a transmission point, which can be an eNodeB. The MAC layer at the UE can be in communication with a PHYsical layer (PHY) 334a at the UE, and the MAC layer at the eNodeB can be in communication with a PHY layer 334b at the eNodeB. The ID module(s) can be configured to buffer and/or drop background messages 306a-d to reduce power costs and signaling overhead otherwise incurred by background messages, in accordance with various examples.

Before performing a handling action on a background message 306a-d, packet analysis can be performed. A "handling action," can refer to buffering and/or dropping a background message. The packet analysis can be performed on a set of transmission packets to identify one or more packets as a background message for which performing a handling action, such as buffering and/or dropping, is appropriate. A set of transmission packets can comprise any number of transmission packets. The step of identifying one or more packets as a background message by packet analysis can take place at an identification module 330a residing at a UE 302 where a set of transmission packets is scheduled to be sent from the UE to the eNodeB 317. Where the set of transmission packets is scheduled to be sent from the eNodeB to the UE, an ID module 330b residing at the eNodeB can perform the packet analysis.

However, the process of packet analysis can consume time, power, and other resources. In certain embodiments, packet analysis can comprise deep packet inspection. Therefore, in one embodiment, the ID Module 330a, 330b can remain inactive when the UE 302 is in a communication mode 304b. When the ID module is in communication mode, additional power costs and signaling overhead that can be associated with the reception of background packets are less of an issue, and may not be an issue at all. Hence, the potential consumption of resources associated with packet analysis may not be warranted.

To avoid unwarranted consumption of resources associated with packet analysis, an ID module 330a, 330b, whether residing with a UE 302 or an eNodeB 317, can be triggered 336a, 336b, or turned-on, when the UE enters a power saving mode 304a. Otherwise, the ID module can remain inactive. The ID module can become deactivated when the UE transitions back to communication mode 304b.

When the ID module 330a resides at the UE 302, the UE can monitor and communicate its mode to the ID module residing therein to trigger 336a activation of the module. Alternatively, the ID module can monitor the UE, triggering 336a itself when the UE transitions to a power saving mode 304a. When the ID module 304b resides at an eNodeB 317, one or more timers 338 at the eNodeB can indicate when a sufficient period of inactivity has passed for the UE to enter a power saving mode 304a.

One or more timers can be used to determine when it is appropriate for the UE to enter different types of low power modes 304a, such as a mid low power mode, where a connection to the E-UTRAN 316 can be maintained, and/or a deep low power mode, where a connection to the E-UTRAN is not maintained. A non-limiting example of a mid low power mode can include DRX mode. A non-limiting example of a deep low power mode can include RRC_IDLE.

When such a timer 338 indicates it is appropriate to transition 301 to a power saving mode 304a, a transition message 340 can be sent to the UE 302 from an eNodeB 317 indicating the UE can transition to a power saving mode. In certain embodiments, the transition message can indicate a particular type of transition mode to which the UE can transition. The UE and/or an ID module 332a residing thereon can monitor for a transition message. In certain embodiments, the UE and the eNodeB can contain synchronous timers, making the transition message unnecessary.

The eNodeB 317 can monitor one or more timers 338. When one or more of these timer expires, the eNodeB 317 can trigger 336b an ID module 330b residing thereon. In certain embodiments, the UE 302 can initiate a request to transition into a low power mode, such as a power saving mode 304a, which the eNodeB can approve or reject. In such embodiments, the eNodeB can trigger the ID module residing on the eNodeB upon approval of such a request. In alternative embodiments, the UE can decide to transition to a low power mode on its own. In such embodiments, the transition message 340 can be sent from the UE to the eNodeB.

Depending on the embodiment, the eNodeB 317 and/or an ID module 332b residing at the eNodeB can monitor one or more timers, approval determinations, and/or transition messages at the eNodeB to trigger 336b the ID module. In such embodiments, the eNodeB and/or the ID module can know that the UE supports the buffering and/or dropping of background messages based on an advance notice 342 sent from the UE to the E-UTRAN 316 and/or an eNodeB residing thereon. The advance notice can indicate that the UE supports the performing of a handling action, such as buffering and/or dropping, on a background message and can accommodate the resultant latency and/or disappearance of such messages.

By way of illustration and not limitation, an advance notice 342 can be embedded in a new Media Access Control (MAC) message configured to communicate the advance notice. In another non-limiting example, the advance notice can be conveyed in a legacy message sent from a UE 302 to indicate features, modalities, routines, etc. that the UE is configured to support. A non-limiting example of such a legacy message can be a Feature Group Indicator (FGI). In such embodiments, an unassigned index bit within an FGI can be assigned to convey this information.

Once an ID module 330a, 330b has been triggered, the ID module can perform actions, such a packet analysis, buffering, and dropping. These actions can reduce the frequency with which power is consumed at a UE 302 and/or the frequency of additional overhead associated with reception of background messages. The following figure serves to expound on actions that can be taken by ID modules.

Figure 4:
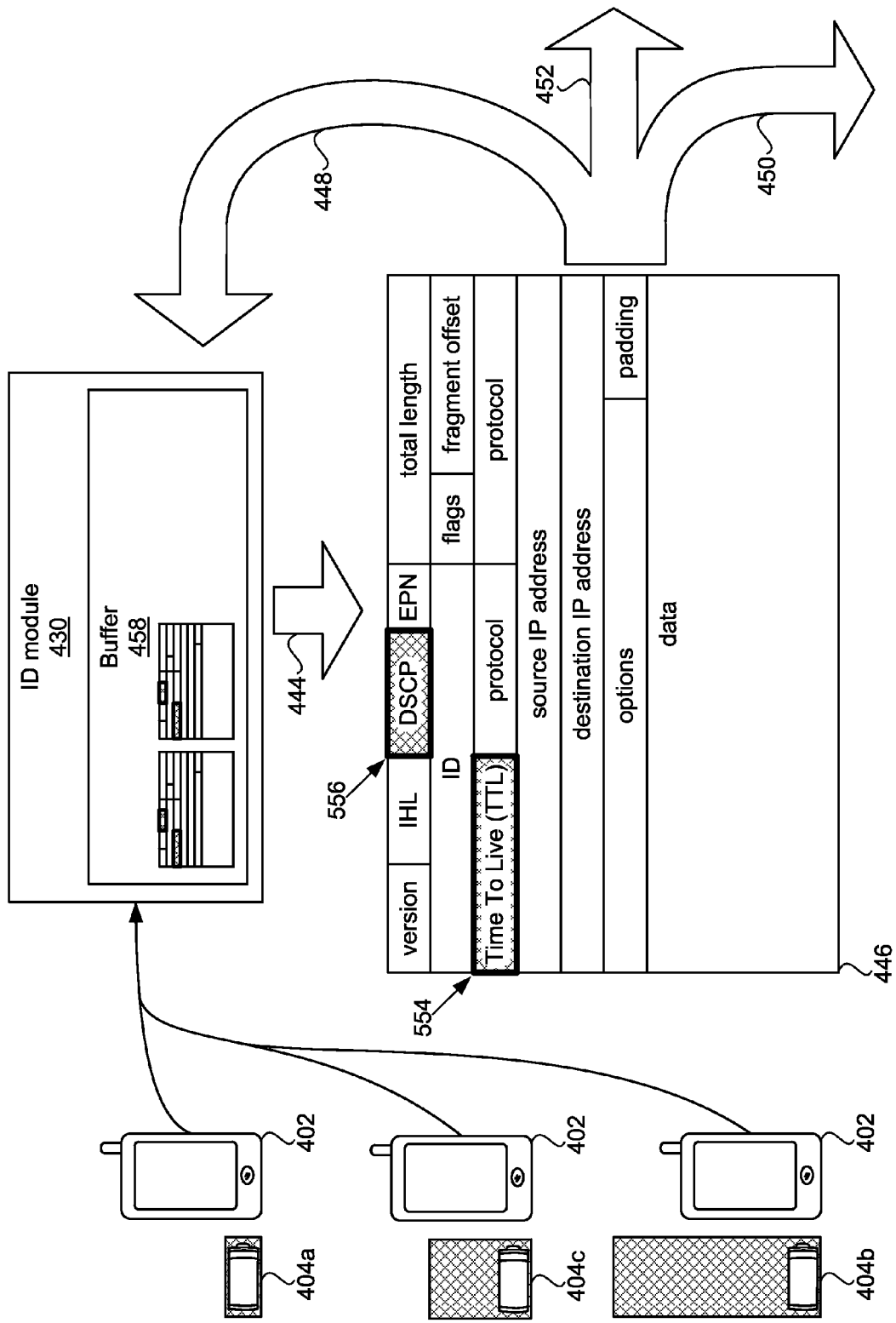
FIG. 4 is a block diagram illustrating an example of an identification module analyzing a packet to determine an action to take with respect to the packet, such as allowing the packet to proceed, buffering the packet, and dropping the packet, in accordance with an example.

FIG. 4 depicts certain activities of an ID module 430. The ID module can analyze, or review, 444 a packet 446 in a set of packets to determine a performance action to take with respect to the packet. Packet analysis, as performed by the ID module, can be used to identify a background message and/or determine the appropriateness of buffering 448 and/or dropping 450 such a message. Where a packet does not comprise a background message, the ID module can allow the packet to proceed 452 unaffected.

The ID module 430 can analyze 444 the packet 446 by reading information from one or more Internet Protocol (IP) headers. One or more of these IP headers can carry information for packet analysis. The information can be used to identify a packet as a background message. The information can be embedded in a Time To Live (TTL) header field 554 and/or a Differentiated Service Code Point (DSCP) IP header field 556. Additional non-limiting examples of IP headers can include an application header and/or a predefined background message header. The predefined background message header field can be known a priori by a transmission point and/or a wireless mobile device.

The ID module 430 can identify a packet 446 as a background message on the basis of a substantial match between a value of an IP header field, such as those discussed above, with a predefined value. Additionally, a value of an IP header field within a predetermined region with respect to a threshold, such as above or below the threshold, can provide an indication that a packet is a background message. The presence of a predefined application header and/or background message header can also provide an indication that a packet is a background message. In addition to, or in place of, reading an IP header, the ID module can review the payload of the packet 446.

Most background messages are comparatively small in size. Therefore, if the payload has a size below a payload threshold, this can be an indication that the packet 446 is a background message. Additionally, or in the alternative, the IP module 430 can be configured to determine whether the payload size is odd or even. The ID module can be configured to interpret an odd or even value as an indication that the packet is a background message. In certain embodiments multiple indications can be necessary for an overall indication of the packet's status.

Not only can a substantial match between a predefined value and an IP header value, a region for an IP header value with respect to a threshold, the presence of a predefined header, and payload size and characteristics be used to determine if a packet 446 is a background message, these factors can also be used to determine the appropriates of buffering 448 the background message. Furthermore, similar approaches can be used to determine when it is appropriate to drop 450 a message. Additionally, a background message can be dropped on the basis, in part or whole, of the type of background message to which the background message pertains. For example, and without limitation, status reports can comprise a type of background message that, in some embodiments, can be dropped, or can be more likely to be dropped. Identification of a background message as a status update can be a particularly strong factor when the status update indicates an internet application is unattended.

Additionally, the ID module 430 can determine whether to buffer 448 or drop 450 a packet 446 based on the mode of the relevant UE 402. In FIG. 4, three different instances of the same UE are depicted to represent the UE in communication mode 404b and two power saving modes comprising a mid low power mode 404c, where a connection with a WWAN can be maintained, and a deep low power mode 404a, where the connection is not maintained. The mode of the UE can be communicated to the ID module. Similarly, an importance value can be embedded in an IP header that can be used to determine whether to buffer or drop a background message. In one embodiment, a background message may be dropped if an updated background message is received that contains the same, but updated information. For instance, a status of whether a person is active or inactive on their social media application may be received at a periodic rate. When a next "status" background message is received, the previous background message can be dropped.

If the UE 402 is in a deep low power mode 404a, the ID module 430 can simply determine to drop 450 a background message or use this information as a factor suggestive of the appropriates of dropping the background message. Conversely, if the UE is in a mid low power mode 404c, the ID module can determine to buffer 448 background message, or use this information as a factor suggestive of the appropriateness of buffering the background message. Where the UE is in a communication mode 404a, the ID module can be suspended and the background message can be allowed to proceed 452.

The ID module 430 can include a buffer 458 in which the packet 446 can be buffered 448. The buffer, however, can also be located outside of the ID module while remaining in communication with the ID module. As indicated by the two packets, depicted by miniaturized versions of the packet 446, in the buffer in FIG. 4, the buffer can hold a set of packets, where the set can be a wide range of sizes.

The buffer 458 can retain and the delay the packets/background messages therein for a period of time. The period of time can reduce the frequency with which the UE 402 has to draw on power and/or impose additional signaling overhead to send and receive background messages. The period of time can be determined so as to place reasonable demands of the power of the UE and/or WWAN resources with respect to signaling overhead.

By way of a non-limiting example used for purposes of illustration, a timer used to determine whether a UE 402 can remain in a mid low power mode 404c and/or a deep power mode 404a can be the basis of such a determination. If messages are sent or received during this timer, the UE may not be allowed to stay in mid low power mode, a deep power mode, or transmission from a mid low power mode to a deep power mode. Therefore, background messages can be buffered until after such a timer has expired, allowing the UE to receive the background message and then return, or proceed to, a low power, or lower power mode respectively. Many different approaches to determining a period of time buffering can be recognized by those of ordinary skill in the art.

In certain embodiments, the buffered background messages can be sent on their way after the UE enters one of its pre-scheduled wake-up periods. A wake-up scheduled to check a paging channel can comprise one example of such a wake-up period. This wake-up period can span one or more wake-up periods, that would otherwise be observed, but which are ignored to reduce resource demands.

FIG. 4 can also serve as a basis for a discussion of actions that can take place to facilitate the identification of background messages and the performance of actions with respect to these messages. Since the information about a packet's 446 status as a background message can be embedded in IP headers, such as a TTL field 454 and DSCP field 456, once a determination is made that a packet is a background message, an indication and/or handling information can be embedded in the packet at the IP layer. Since battery power and signaling issues can primarily be issues where wireless mobile devices are concerned, this step can also be accomplished between the IP and Radio layers. Once the relevant information has been embedded, the packet can be sent to its destination. For the sake of additional clarity, additional examples of consistent methods and devices are provided below.

Figure 5:
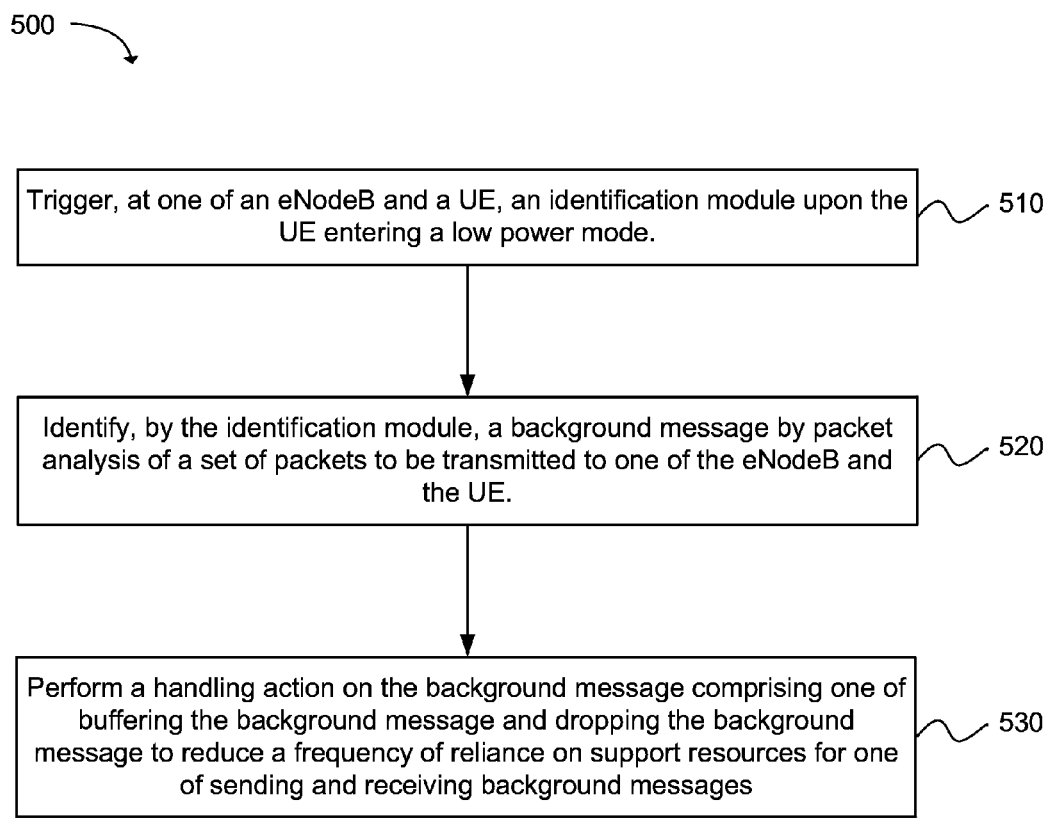
FIG. 5 is a flowchart depicting a process to reduce wireless-mobile-device power consumption and signaling overhead for internet applications, in accordance with another example.

FIG. 5 is a flowchart consistent with examples of a method 500 to reduce power consumption and signaling overhead for internet applications associated with UEs. The method can, but need not necessarily, be embedded in a computer program product comprising a non-transitory computer usable medium. Non-transitory, as used herein, refers to a storage medium that is enduring and not in transit, to positively affirm that the computer usable medium is not a transitory electrical signal. The computer readable medium can have a computer readable program code embodied therein. The computer readable program code can be adapted to be executed to implement instructions for the method.

The method 500 can comprise triggering 510, at one of an eNodeB and a UE, an ID module upon the UE entering a low power mode. The low power mode can be a power saving mode, such as, by way of example and not limitation, DRX mode and RRC_IDLE mode. The ID module can identify 520 a background message by packet analysis of a set of packets. Packets in the set of packets can be intended for transmission to an eNodeB or UE. A handling action can be performed 530 on the background message. Such a handling action can comprise buffering the background message and/or dropping the background message to reduce a frequency of reliance on support resources, such as battery power and signaling overhead, for sending and receiving background messages.

The method 500 can further comprise reading, by the ID module, an IP header field of a packet in the set of packets. The IP header can be read to acquire information for the packet analysis. Depending on the embodiment and by way of illustration and not limitation, the IP header field can comprise a TTL IP header field, a DSCP IP header field, an application header, and/or a predefined background message header known a priori by an eNodeB and/or the UE on which an ID module resides.

In certain embodiments, the method 500 can also comprise determining whether performing the handling action comprises buffering the background message and/or dropping the background message. The determination can be based on at least one of a substantial match between a value of the IP header field with a predefined value. The determination can also be based on whether the value of the IP header field is below a threshold, and/or a payload with an even-sized, or odd-sized payload. Additionally, the determination can be based on the presence of a predefined application header and/or the presence of a predefined background message header known a priori by at least one of an eNodeB and a UE on which an ID module resides.

Some examples of the method 500 can further comprise determining whether performing the handling action comprises one of buffering the background message and dropping the background message. The determination can be based, at least in part, on the low power/power saving mode of the UE. The low power/power saving mode of the devise can comprise a mid low power mode. A power saving mode, such as DRX mode, which can maintain a connection with a WWAN, provides one non-limiting example of such a mid low power mode. The low power/power saving mode of the devise can also comprise a deep low power mode. A power saving mode, such as RRC_IDLE mode, which does maintain a connection with a WWAN, provides one non-limiting example of such a deep low power mode.

Additionally, depending on the embodiment, the method 500 can also comprise providing advance notice from the UE to the eNodeB. The advance notice can indicate that the UE supports performing the handling action on the background message, the handling action comprising buffering the background message and/or dropping the background message. In such embodiments, the triggering of the ID module can occur as a corollary of the UE entering the low power mode. Providing such an advance notice can comprise sending a MAC message configured to provide the advance notice and/or embedding the advance notice in an FGI.

As further examples of potential additional features of the method 500, some embodiments can send the buffered background message when the UE performs a periodic wake-up consistent with the low power mode of the UE. Also, in some embodiments, triggering the ID module, identifying the background message, and performing the handling action can occur within a MAC layer at the eNodeB where downlink transmission occurs and/or within a MAC layer at the UE where uplink transmission occurs.

Figure 6:
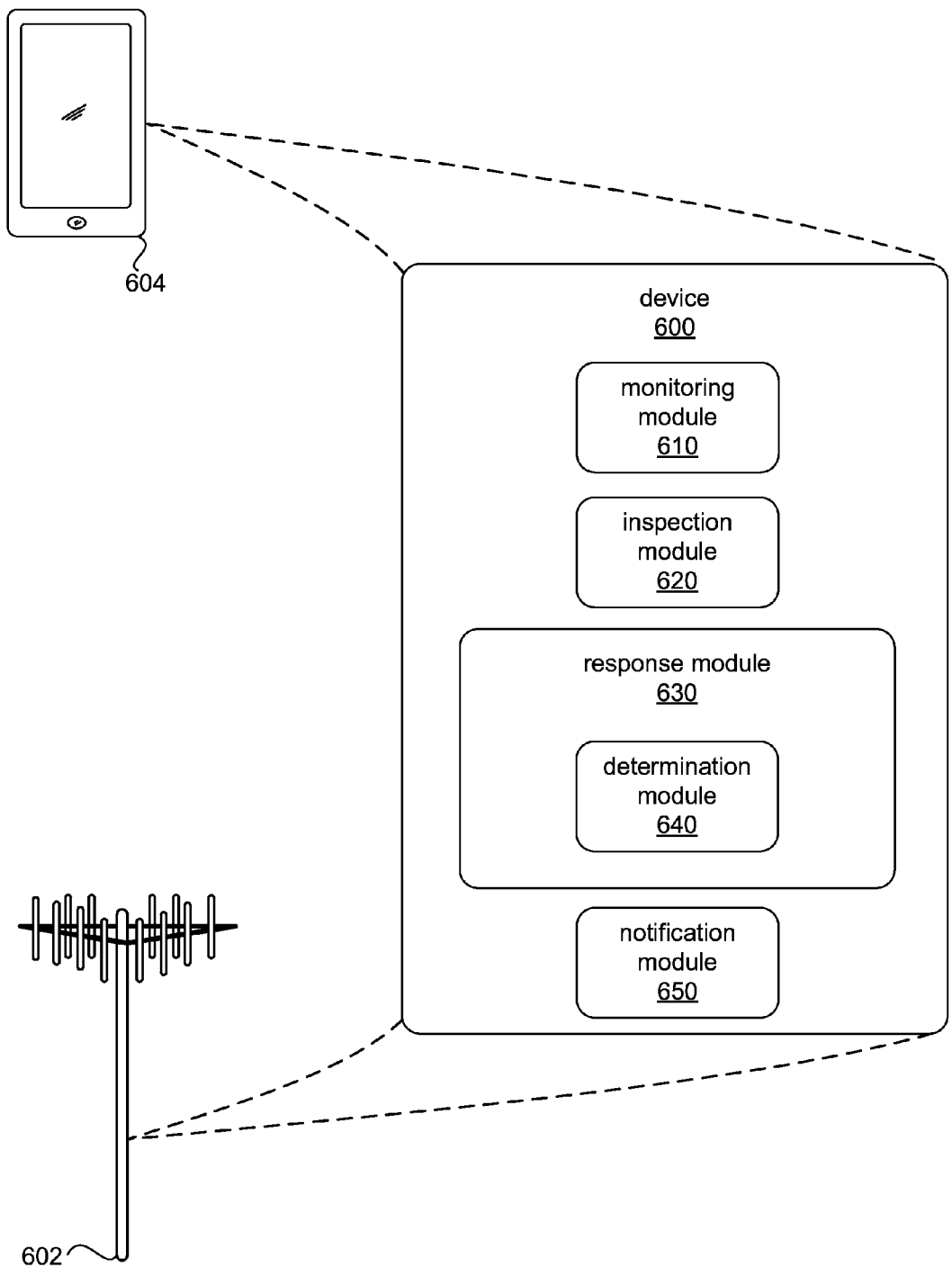
FIG. 6 is a block diagram illustrating a device for reducing power consumption at a wireless mobile device and signaling overhead caused by frequent wireless communication by background messages, in accordance with an example.

FIG. 6 depicts a device 600 for reducing power consumption at a wireless mobile device and signaling overhead caused by frequent wireless communication of background messages, in accordance with an example. The device may or may not comprise an identification module similar to those discussed with respect to previous figures. The device can reside at a transmission point 602, such as, without limitation, an eNodeB, and/or a wireless mobile device 604, such as, without limitation, a UE. The device can comprise a monitoring module 610, an inspection module 620, and/or a response module 630.

The monitoring module 610 can be configured to monitor the UE 610, to determine whether the UE is in one of a power saving mode and not in the power saving mode. The inspection module 620, which can be in communication with the monitoring module, can be configured to review a set of packets. The inspection module can review the set of packets for an indication that a packet in the set of packets comprises a background message when the UE is in the power saving mode. The response module 630 can be in communication with the inspection module. Furthermore, the response module can be configured to buffer the background message until the UE enters a wake-up phase or a period of time has elapsed, when the indication does not contain a parameter value contrary to buffering. Where a packet does not include an overall indication that the packet is a background message, such a parameter value contrary to buffering can be considered present.

Some embodiments of the device 600 can further comprise a determination module 640 in communication with the response module 630. The determination module can be configured to direct the response module to perform buffering the message and/or dropping the message based. The direction can be based on the parameter value in the indication. The indication can reside in an IP header field of the background message.

In certain of such embodiments, the determination module 640 can direct the response module 630 to buffer the background message when: (1) a parameter value in an IP header corresponds with a first predetermined value; (2) the parameter value is within a first predetermined region being one of above and below a threshold; (3) the background message has a payload with an even-sized payload and the payload also has a size below a first payload threshold; (4) the background message has a predefined application header corresponding to a first set of application headers; and/or, the background message has a predefined buffer header known a priori by at least the eNodeB 602 and/or the UE 604.

Additionally, in some embodiments of the device 600, the determination module 640 can direct the response module 630 to drop the background message when: (1) the parameter value corresponds with a second predetermined value; (2) the parameter value is within a second predetermined region, being one of above and below the threshold, the second predetermined region defined as an opposite of the first predetermined region relative to the threshold; (3) the background message has an even-sized payload, when the payload also has a size below a payload threshold; (3) the background message has a predefined application header corresponding to a first set of application headers; and/or (4) the background message has a predefined drop header known a priori by the eNodeB and/or the UE.

Furthermore, in some embodiments, the determination module 640 can direct the response module to buffer the background message when the power saving mode comprises a mid low power mode. Conversely, the determination module can direct the response module to drop the background message when the power saving mode comprises a deep low power mode. With respect to the device 600, the mid low power mode can be a DRX mode, and the deep low power mode can be an RRC_IDLE mode. With respect to some embodiments, the IP header field can be a TTL IP header field, DSCP IP header field, an application header, and/or a predefined background message header. The predefined background message header can be known a priori by the eNodeB and/or the UE.

Certain embodiments can include a notification module 650. The notification module can be configured to provide a notice to the eNodeB that the UE supports at least one of buffering background messages and dropping background messages. In some embodiments, the monitoring, inspection, and response modules can reside within a MAC layer.

Figure 7:
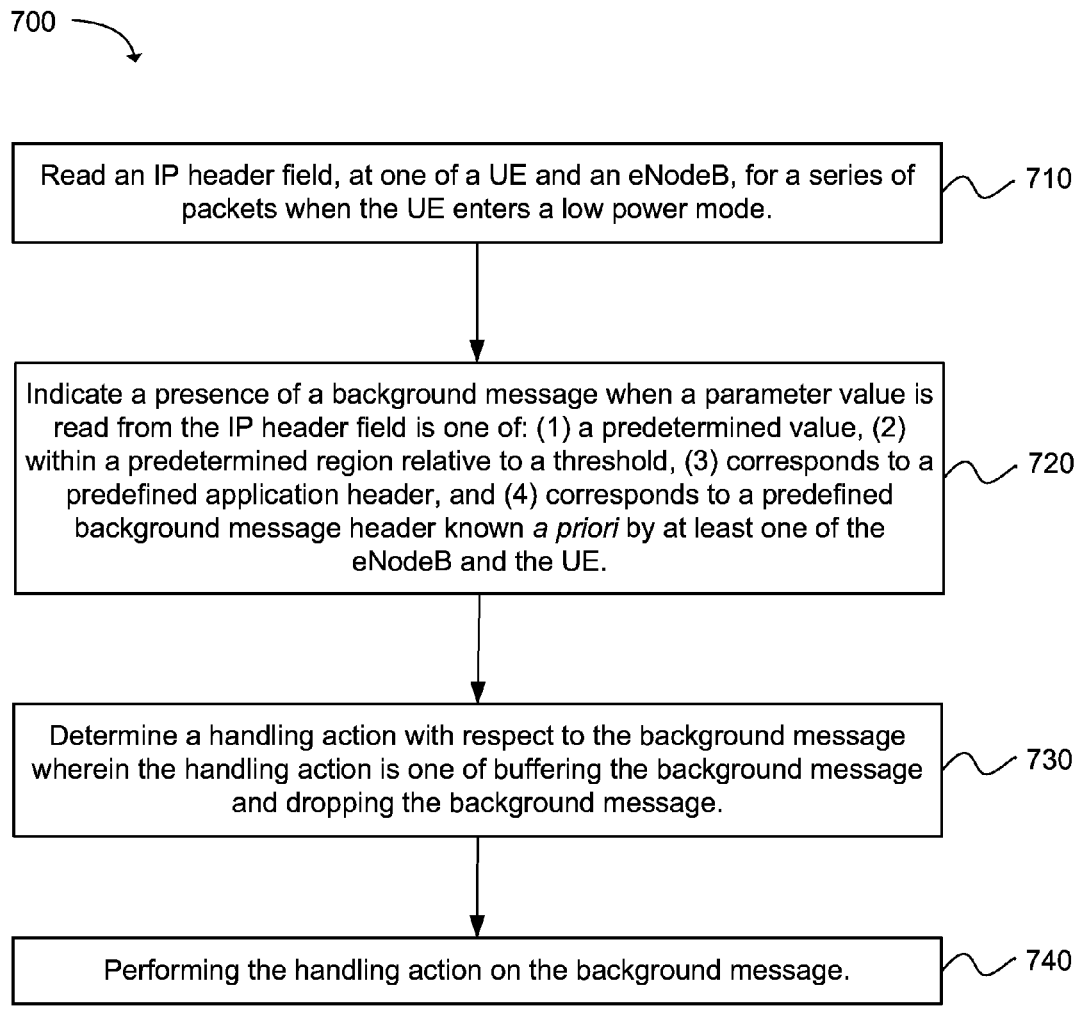
FIG. 7 is a flowchart depicting a process for reducing power consumption and signaling overhead from background messages associated with applications running in a wireless environment, in accordance with an example.

FIG. 7 is a flowchart of a method 700 for reducing power consumption and signaling overhead from background messages associated with applications running in a wireless environment. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 700 can comprise reading 710 an IP header field, at one of a UE and an eNodeB, for a series of packets. The reading can begin when the UE enters a low power mode. Additionally, the method can comprise indicating 720 the presence of a background message when a parameter value is read from the IP header field that is: (1) substantially a predetermined value; (2) within a predetermined region relative to a threshold; (3) corresponds to a predefined application header; (4) corresponds to a predefined background message header known a priori by at the wireless eNodeB and/or the UE; and/or indicating the presence of a background message when, the background message has a packet size that: (1) can be one of an even size and an odd size and/or (2) within a pre-determined range.

Additionally, the method 700 can comprise determining 730 a handling action with respect to the background message. The handling action can comprise buffering the background message and/or dropping the background message. The handling action can also be performed 740 on the background message.

In some embodiments, determining 730 a handling action can further comprise determining to buffer the background message when the parameter value correlates to an importance value above an importance threshold. Additionally, determining the handling action can also comprise dropping the background message when the parameter value correlates to an importance value not above the importance threshold.

Determining 730 the handling action can also comprise determining to buffer the background message when a combination of a weighted importance value and a weighted mode value produce a combined value correlated to a first determination to buffer the background message. In such embodiments, the weighted importance value can be correlated to the parameter value. The weighted mode value can be correlated to the UE being in a mid low power mode and/or a deep low power mode.

Alternatively, determining 730 the handling action can also comprise determining to drop the background message when a combination of a weighted importance value and a weighted mode value combine to produce a combined value correlated to a second determination to drop the background message. Again, the weighted importance value can be correlated to the parameter value. The weighted mode value can also be correlated to the UE being in a mid low power mode and/or a deep low power mode. Additionally, a determination can be made to drop the background message when the parameter value indicates the background message is a status update conveying a message that an application is in an unattended mode.

In certain embodiments, the mid low power mode can be a DRX mode, and the deep low power mode can be an RRC_IDLE mode. In some embodiments, reading the IP header field, indicating the presence of the background message, determining the handling action, and performing the handling action can take place in a MAC layer. Additionally, some embodiments of the method can further comprise first indicating, by the UE to the eNodeB, that the UE is configured for a background message buffering scenario and/or a background message dropping scenario.

In addition to actions taken to buffer and/or drop background messages at a UE and/or an eNodeB, actions can be taken with respect to the background messages to facilitate the buffering and dropping of such messages. Such actions can configure background messages to provide indications about the appropriateness of buffering and/or dropping such messages. The following figure can illustrates examples of a method consistent with such additional actions.

Figure 8:
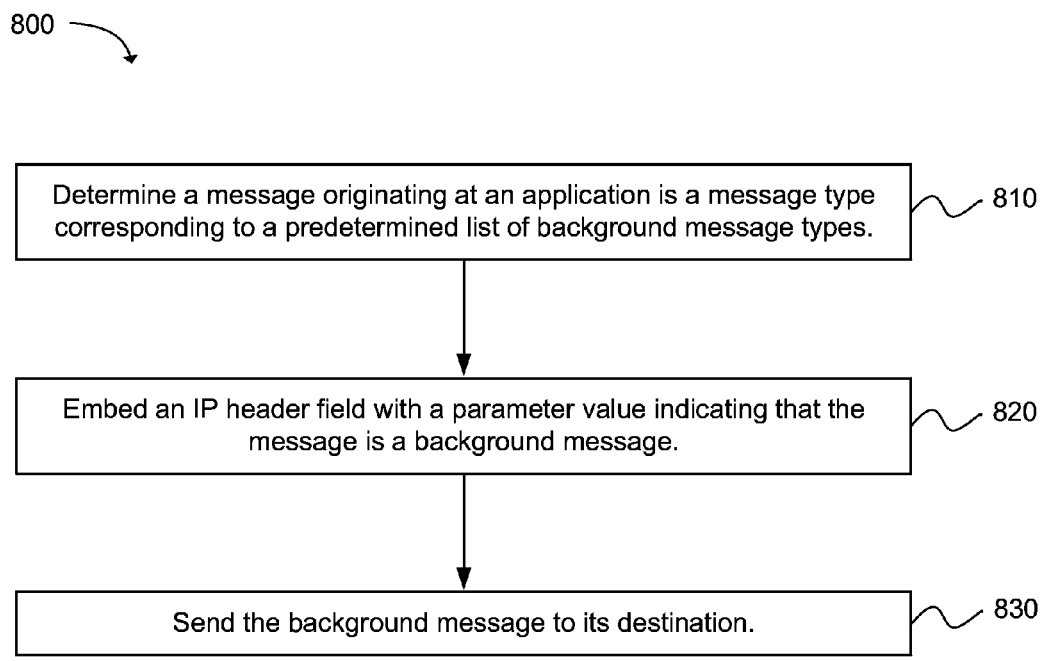
FIG. 8 is a block diagram illustrating a device to configure background messages for power and signaling reduction measures, in accordance with an example; and, FIG. 9 is a block diagram of a UE in accordance with another example.

FIG. 8 is a flowchart of a method 800 to configure background messages for power and signaling reduction measures. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 800 can comprise determining 810 that a message originating at an application is of a message type corresponding to a predetermined list of background message types. An IP header field can be embedded 820 with a parameter value indicating that the message is a background message. The background message can then be sent 830 to its destination.

Some embodiments can further comprise evaluating the message to assign an importance level. The importance level can be assigned to the message within a predetermined code included in the parameter value. Depending on the embodiment, the IP header field can be a TTL IP header field, a DSCP IP header field, an application header, and/or a predefined background message header. The background header can be known a priori by at least one of an eNodeB and a UE.

Certain embodiments can further comprise providing an indication encoded in the parameter value. The indication can be about a first handling action where the UE is in a DRX mode. Conversely, the indication can be about a second handling action where the UE is in an RRC_IDLE mode.

Figure 9:
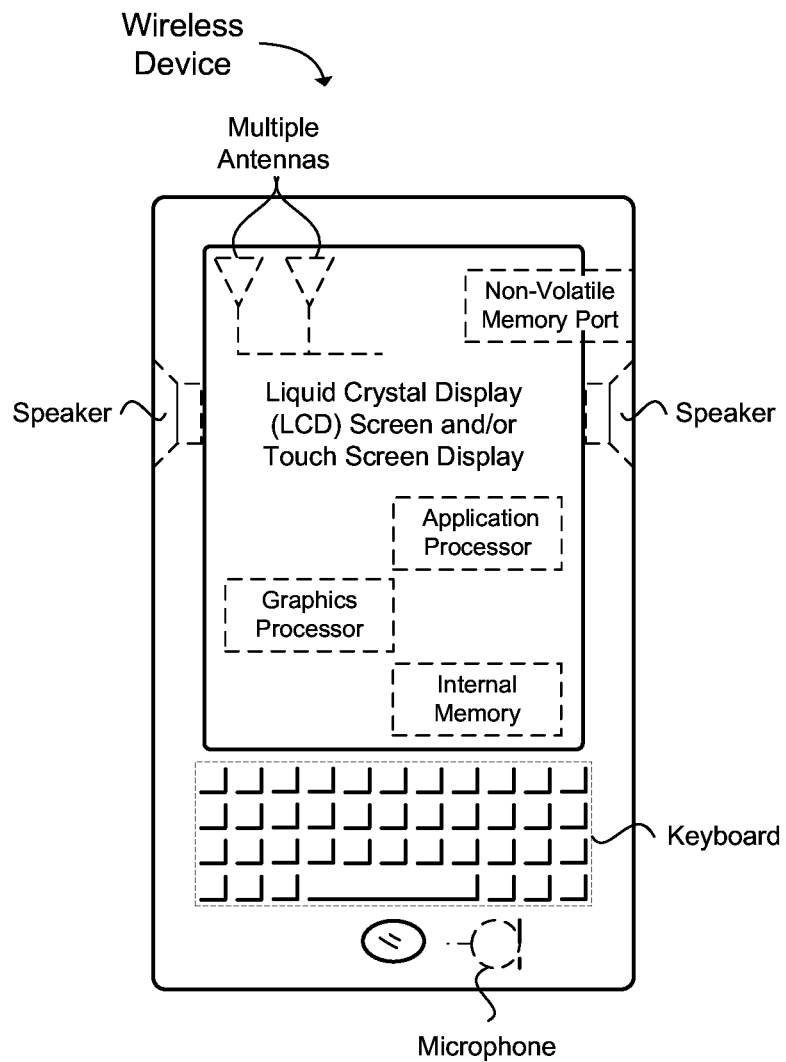

FIG. 9 provides an example illustration of a mobile device, such as UE, a mobile station (MS), a mobile wireless mobile device, a mobile communication device, a tablet, a handset, or other type of mobile wireless mobile device. The mobile device can include one or more antennas configured to communicate with a BS, an eNodeB, or other type of WWAN transmission point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a Wireless Local Area Network (WLAN), a Wireless Personal Area Network (WPAN), and/or a WWAN.

FIG. 9 also provides an illustration of a microphone and one or more speakers that can be used for audio input and output from the mobile device. The display screen may be a Liquid Crystal Display (LCD) screen, or other type of display screen such as an Organic Light Emitting Diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. Non-volatile memory can include a Solid State Drive (SSD), Flash Random Access Memory (RAM), and so forth. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, Solid State Drives (SSD), flash RAM, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer program product comprising a non-transitory computer usable medium having a computer readable program code embodied therein, the computer readable program code adapted to be executed to implement instructions to reduce power consumption and signaling overhead for internet applications, comprising:
   triggering, at one of an evolved Node B (eNodeB) and a User Equipment (UE), an identification module upon the UE entering a low power mode;
   identifying, by the identification module, an Internet Protocol (IP) header field of a background message by packet analysis of a set of packets to be transmitted to one of the eNodeB and the UE;
   performing a handling action on the background message comprising one of buffering the background message and dropping the background message based on the IP header field of the background message to reduce one of sending and receiving background messages, and
   providing advance notice from the UE to the eNodeB indicating that the UE supports performing the handling action on the background message so that the triggering of the identification module occurs as a corollary to the UE entering the low power mode.

2. The computer program product of claim 1, wherein the IP header field is at least one of a Time to Live (TTL) IP header field, a Differentiated Services Code Point (DSCP) IP header field, an application header, and a predefined background message header known a priori by at least one of the eNodeB and the UE.

3. The computer program product of claim 1, further comprising determining whether performing the handling action comprises one of buffering the background message and dropping the background message based on at least one of:
   a substantial match between a value of the IP header field with a predefined value;
   whether the value of the IP header field is below a threshold;
   a payload with an even-sized payload when the payload also has a size below a payload threshold;
   the presence of a predefined application header; and,
   the presence of a predefined background message header known a priori by at least one of the eNodeB and the UE.

4. The computer program product of claim 1, further comprising determining whether performing the handling action comprises one of buffering the background message and dropping the background message based on the low power mode of the UE comprising one of a mid low power mode and a deep low power mode.

5. The computer program product of claim 4, wherein the mid low power mode is a Discontinuous Reception (DRX) mode, and the deep low power mode is a Radio Resource Control IDLE mode.

6. The computer program product of claim 1, wherein providing advance notice further comprises one of sending a Media Access Control (MAC) message configured to provide the advance notice and embedding the advance notice in a Feature Group Index (FGI).

7. The computer program product of claim 1, further comprising sending the buffered background message when the UE performs a periodic wake-up consistent with the low power mode of the UE.

8. The computer program product of claim 1, wherein the triggering the identification module, the identifying the background message, and the performing the handling action occur within a Media Access Control (MAC) layer at one of the eNodeB where downlink transmission occurs and within a MAC layer at the UE where uplink transmission occurs.

9. A device for reducing power consumption at a User Equipment (UE) signaling overhead caused by frequent wireless communication of background messages, comprising:
   a monitoring module, at one of an evolved Node B (eNodeB) and a User Equipment (UE), configured to monitor the UE to determine whether the UE is in one of a power saving mode and not in the power saving mode;
   an inspection module, in communication with the monitoring module, configured to review a set of packets for an indication that a packet in the set of packets comprises a background message when the UE is in the power saving mode;
   a response module, in communication with the inspection module, configured to buffer the background message until one of the UE enters a wake-up phase and a period of time has elapsed, when the indication does not contain a parameter value contrary to buffering; and
   a determination module, in communication with the response module, configured to direct the response module to perform one of buffering the message and dropping the message based on the parameter value in the indication, wherein the indication resides in an Internet Protocol (IP) header field of the background message.

10. The device of claim 9, wherein the determination module directs the response module to buffer the background message when at least one of:
    the parameter value corresponds with a first predetermined value,
    the parameter value is within a first predetermined region being one of above and below a threshold,
    the background message has a payload with an even-sized payload and the payload also has a size below a first payload threshold,
    the background message has a predefined application header corresponding to a first set of application headers, and
    the background message has a predefined buffer header known a priori by at least one of the eNodeB and the UE.

11. The device of claim 10, wherein the determination module directs the response module to drop the background message when at least one of:
    the parameter value corresponds with a second predetermined value,
    the parameter value is within a second predetermined region being one of above and below the threshold, the second predetermined region defined as an opposite of the first predetermined region, relative to the threshold;
    the background message has a payload with an even-sized payload and the payload also has a size below a payload threshold,
    the background message has a predefined application header corresponding to a first set of application headers, and
    the background message has a predefined drop header known a priori by at least one of the eNodeB and the UE.

12. The device of claim 9, wherein the determination module directs the response module:
    to buffer the background message where the power saving mode comprises a mid low power mode, and
    to drop the background message where the power saving mode comprises a deep low power mode.

13. The device of claim 12, wherein the mid low power mode is a Discontinuous Reception (DRX) mode and the deep low power mode is an RRC_IDLE mode.

14. The device of claim 9, wherein the IP header field is at least one of a Time To Live (TTL) IP header field, a Differentiated Services Code Point (DSCP) IP header field, an application header, and a predefined background message header known a priori by at least one of the eNodeB and the UE.

15. The device of claim 9, further comprising a notification module, residing at the UE, configured to provide a notice to the eNodeB that the UE supports at least one of buffering background messages and dropping background messages.

16. The device of claim 9, wherein the monitoring, inspection, and response modules reside within a Media Access Control (MAC) layer.

17. A method for reducing power consumption and signaling overhead from background messages associated with applications running in a wireless environment, comprising:
  reading an Internet Protocol (IP) header field, at one of a User Equipment (UE) and an evolved Node B (eNodeB), for a series of packets when the UE enters a low power mode;
  indicating a presence of a background message when at least one of:
    a parameter value is read from the IP header field that is substantially a predetermined value,
    a parameter value is read from the IP header field that is within a predetermined region relative to a threshold,
    a parameter value is read from the IP header field that corresponds to a predefined application header, and
    a parameter value is read from the IP header field that corresponds to a predefined background message header known a priori by at least one of the eNodeB and the UE,
    the background message has an even packet size, and
    the background message has a packet size within a predetermined range;
  determining a handling action with respect to the background message, wherein the handling action is one of buffering the background message when the parameter value correlates to an importance value above an importance threshold, and dropping the background message based on the IP header field for the series of packets when the parameter value correlates to an importance value not above the importance threshold; and,
  performing the handling action on the background message.

18. The method of claim 17, wherein determining the handling action comprises:
  determining to buffer the background message when:
    a combination of a weighted importance value that is correlated to the parameter value, and
    a weighted mode value that is correlated to one of a mid low power mode and a deep low power mode,
    produce a combined value correlated to a first determination to buffer the background message; and
  determining to drop the background message when:
    a combination of a weighted importance value that is correlated to the parameter value, and
    a weighted mode value correlated to one of the mid low power mode and the deep low power mode,
    produce a combined value correlated to a second determination to drop the background message.

19. The method of claim 18, wherein the mid low power mode is a Discontinuous Reception (DRX) mode, and the deep low power mode is an RRC_Idle mode.

20. The method of claim 17, wherein determining the handling action comprises determining to drop the background message when the parameter value indicates the background message is a status update conveying a message that an application is in an unattended mode.

21. The method of claim 17, further comprising first indicating, by the UE to the eNodeB, that the UE is configured for at least one of a background message buffering scenario and a background message dropping scenario.

22. The method of claim 17, wherein the reading the IP header field, the indicating the presence of the background message, the determining the handling action, and the performing the handling action take place in a Media Access Control (MAC) layer.

23. A computer program product comprising a non-transitory computer usable medium having a computer readable program code embodied therein, the computer readable program code adapted to be executed to configure background messages for power and signaling reduction measures, comprising:
  determining a message originating at an application is a message type corresponding to a predetermined list of background message types;
  embedding an Internet Protocol (IP) header field with a parameter value indicating that the message is a background message;
  evaluating the message to assign an importance level;
  assigning the importance level to the message within a predetermined code included in the parameter value; and
  sending the background message to its destination.

24. The computer program product of claim 23, wherein the IP header field is at least one of a Time to Live (TTL) IP header field, a Differentiated Services Code Point (DSCP) IP header field, an application header, and a predefined background message header known a priori by at least one of an evolved Node B (eNodeB) and a User Equipment (UE).

25. The computer program product of claim 23, further comprising providing an indication encoded in the parameter value about a first handling action where the UE is in a Discontinuous Reception (DRX) mode and a second handling action where the UE is in a RRC_IDLE mode.

* * * * *